United States Patent
Friehauf et al.

(10) Patent No.: US 10,465,501 B2
(45) Date of Patent: Nov. 5, 2019

(54) DAS METHOD OF ESTIMATING FLUID DISTRIBUTION

(71) Applicant: CONOCOPHILLIPS COMPANY, Houston, TX (US)

(72) Inventors: Kyle Friehauf, Houston, TX (US); Mark R. Gibson, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 30 days.

(21) Appl. No.: 15/453,044

(22) Filed: Mar. 8, 2017

(65) Prior Publication Data

US 2017/0260849 A1 Sep. 14, 2017

Related U.S. Application Data

(60) Provisional application No. 62/305,758, filed on Mar. 9, 2016, provisional application No. 62/305,777, filed on Mar. 9, 2016.

(51) Int. Cl.
*E21B 47/10* (2012.01)
*G01K 11/32* (2006.01)
(Continued)

(52) U.S. Cl.
CPC ...... *E21B 47/101* (2013.01); *E21B 47/02208* (2013.01); *E21B 47/02216* (2013.01);
(Continued)

(58) Field of Classification Search
CPC .... E21B 47/101; E21B 41/0092; E21B 43/16; E21B 43/166; E21B 43/20;
(Continued)

(56) References Cited

U.S. PATENT DOCUMENTS

| 3,981,187 A | 9/1976 | Howell |
| 4,676,664 A | 6/1987 | Anderson et al. |

(Continued)

FOREIGN PATENT DOCUMENTS

| GB | 2492802 A | 1/2013 |
| WO | 2001048353 A1 | 7/2001 |

(Continued)

OTHER PUBLICATIONS

Boone, K., et al—"Monitoring Hydraulic Fracturing Operations Using Fiber-Optic Distributed Acoustic Sensing", 2015, Unconventional Resources Technology Conference, SPE-178648-MS/URTeC:2158449, Presented at the Unconventional Resources Technology Conference held in San Antonio, TX, USA Jul. 20-22 , 2015, pp. 1-8; 8 pgs.

(Continued)

*Primary Examiner* — Yong-Suk Ro
(74) *Attorney, Agent, or Firm* — Boulware & Valoir

(57) ABSTRACT

This disclosure describes a method of calculating fluid distribution from a hydraulically fractured well, especially during a plug-and-perf hydraulic fracturing operation. The Distributed Acoustic Sensing (DAS) data is used to quantify the fluid distribution in separate perf clusters during fracturing, and the result can be used for completion design and optimization, hydraulic fracturing, and ultimately for oil and gas production.

17 Claims, 3 Drawing Sheets

(51) Int. Cl.
  *E21B 47/12* (2012.01)
  *E21B 47/022* (2012.01)
  *G01H 9/00* (2006.01)
  *G01V 1/22* (2006.01)
  *G01V 1/40* (2006.01)

(52) U.S. Cl.
  CPC ............ *E21B 47/123* (2013.01); *G01H 9/004* (2013.01); *G01K 11/32* (2013.01); *G01V 1/226* (2013.01); *G01V 1/40* (2013.01)

(58) Field of Classification Search
  CPC ...... E21B 43/2406; E21B 43/26; E21B 44/00; E21B 47/00; E21B 47/02208; E21B 47/02216; E21B 47/123; E21B 49/00; E21B 33/12; E21B 47/065; E21B 47/1015; E21B 47/0006; E21B 47/091; G01B 11/161; G01F 1/666; G01K 11/32; G01V 1/226; G01V 1/40; G01N 29/24; G01N 29/2418; G01H 9/00; G01H 9/004; G01D 5/35383; G01D 5/36
  See application file for complete search history.

(56) References Cited

U.S. PATENT DOCUMENTS

| | | | |
|---|---|---|---|
| 6,026,913 | A | 2/2000 | Mandel et al. |
| 6,176,323 | B1 | 1/2001 | Weirich et al. |
| 6,268,911 | B1 | 7/2001 | Tubel et al. |
| 6,778,720 | B1 | 8/2004 | Cekorich et al. |
| 7,668,411 | B2 | 2/2010 | Davies et al. |
| 8,505,625 | B2 | 8/2013 | Ravi et al. |
| 8,630,816 | B2 | 1/2014 | Park et al. |
| 8,646,968 | B2 | 2/2014 | MacDougall et al. |
| 8,930,143 | B2 | 1/2015 | Sierra et al. |
| 8,950,482 | B2 | 2/2015 | Hill et al. |
| 9,116,119 | B2 | 8/2015 | Le Floch |
| 9,273,548 | B2 | 3/2016 | LeBlanc et al. |
| 9,416,644 | B2 | 8/2016 | McEwen-King et al. |
| 10,095,828 | B2 | 10/2018 | Swan et al. |
| 2002/0180728 | A1 | 12/2002 | Neff et al. |
| 2003/0205375 | A1 | 11/2003 | Wright et al. |
| 2006/0272809 | A1 | 12/2006 | Tubel et al. |
| 2008/0277568 | A1 | 11/2008 | Crickmore et al. |
| 2009/0114386 | A1 | 5/2009 | Hartog et al. |
| 2009/0194333 | A1 | 8/2009 | MacDonald |
| 2009/0326826 | A1 | 12/2009 | Hull et al. |
| 2010/0200743 | A1 | 8/2010 | Forster et al. |
| 2010/0284250 | A1 | 11/2010 | Cornish et al. |
| 2011/0019178 | A1 | 1/2011 | Vlatas |
| 2012/0017687 | A1 | 1/2012 | Davis et al. |
| 2012/0057432 | A1* | 3/2012 | Hill ................... E21B 43/11857 367/81 |
| 2012/0067118 | A1 | 3/2012 | Hartog et al. |
| 2012/0111560 | A1 | 5/2012 | Hill et al. |
| 2012/0147924 | A1 | 6/2012 | Hall |
| 2013/0023353 | A1 | 1/2013 | Wright |
| 2013/0211726 | A1 | 8/2013 | Mestayer et al. |
| 2013/0233537 | A1 | 9/2013 | McEwen-King et al. |
| 2013/0298635 | A1 | 11/2013 | Godfrey |
| 2013/0298665 | A1 | 11/2013 | Minchau |
| 2014/0036628 | A1 | 2/2014 | Hill et al. |
| 2014/0110124 | A1 | 4/2014 | Goldner et al. |
| 2014/0126325 | A1* | 5/2014 | Farhadiroushan ..... G01V 11/00 367/35 |
| 2014/0163889 | A1 | 6/2014 | Finfer et al. |
| 2014/0180592 | A1* | 6/2014 | Ravi ..................... E21B 47/101 702/12 |
| 2014/0202240 | A1 | 7/2014 | Skinner et al. |
| 2014/0216151 | A1 | 8/2014 | Godfrey et al. |
| 2014/0246191 | A1 | 9/2014 | Zolezzi-Garreton |
| 2014/0260588 | A1 | 9/2014 | Jaaskelainen et al. |
| 2014/0290936 | A1* | 10/2014 | Wills ..................... E21B 43/26 166/250.1 |
| 2014/0358444 | A1 | 12/2014 | Friehauf et al. |
| 2014/0365130 | A1 | 12/2014 | Woods |
| 2015/0014521 | A1 | 1/2015 | Barfoot |
| 2015/0135819 | A1* | 5/2015 | Petrella ................... G01V 1/40 73/152.58 |
| 2015/0146759 | A1 | 5/2015 | Johnston |
| 2015/0159478 | A1 | 6/2015 | Georgi et al. |
| 2015/0331971 | A1 | 11/2015 | Scollard et al. |
| 2016/0003032 | A1 | 1/2016 | Grubb et al. |
| 2016/0138389 | A1 | 5/2016 | Stokely |
| 2016/0146962 | A1 | 5/2016 | Hayward |
| 2016/0265345 | A1* | 9/2016 | In 'T Panhuis et al. ............... E21B 47/123 |
| 2016/0266276 | A1 | 9/2016 | Stokely et al. |
| 2017/0045410 | A1 | 2/2017 | Crickmore et al. |
| 2017/0260839 | A1 | 9/2017 | Beardmore et al. |
| 2017/0260842 | A1 | 9/2017 | Jin et al. |
| 2017/0260846 | A1 | 9/2017 | Jin et al. |
| 2017/0260854 | A1 | 9/2017 | Jin et al. |
| 2017/0342814 | A1 | 11/2017 | Krueger et al. |
| 2018/0217285 | A1 | 8/2018 | Walters et al. |
| 2018/0230049 | A1 | 8/2018 | Wysocki et al. |

FOREIGN PATENT DOCUMENTS

| | | |
|---|---|---|
| WO | 2013092906 A2 | 6/2013 |
| WO | 2014201316 A1 | 12/2014 |
| WO | 2015065869 A1 | 5/2015 |
| WO | 2015076976 A1 | 5/2015 |
| WO | 2015094180 A1 | 6/2015 |
| WO | 2015107332 A1 | 7/2015 |
| WO | 2015170113 A1 | 11/2015 |
| WO | 2015187140 A1 | 12/2015 |
| WO | 2015187149 A1 | 12/2015 |
| WO | 2016007161 A1 | 1/2016 |
| WO | 2016069322 A1 | 5/2016 |
| WO | 2017039605 A1 | 3/2017 |
| WO | 2017156339 A1 | 9/2017 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.

Optasense, "Pipeline Integrity Management: Leak Detection", 2013 brochure, www.optasense.com; 5 pgs.

Paleja, Rakesh, et al—"Velocity Tracking for Flow Monitoring and Production Profiling Using Distributed Acoustic Sensing", 2015, Society of Petroleum Engineers, SPE-174823-MS, Presented at the SPE Annual Technical Conference and Exhibition held in Houston, TX USA Sep. 28-30, 2015, pp. 1-16; 16 pgs.

McKinley, R.M., et al—"The Structure and Interpretation of Noise From Flow Behind Cemented Casing", 1973, Journal of Petroleum Technology, Mar. 1973, SPE-AIME, Esso Production Research, pp. 329-338; 10 pgs.

McKinley, R.M., et al—"Specialized Applications of Noise Logging", 1979, Journal of Petroleum Technology, Nov. 1979, SPE-AIME, Exxon Production Research Co., pp. 1387-1395; 9 pgs.

International Search Report dated Jun. 1, 2017 for International Application No. PCT/US2017/021659; 1 pg.

Awada, A., et al. "Is that interference? A work flow for identifying and analyzing communication through hydraulic fractures in a multiwell pad," SPE Journal, vol. 21, No. 5, pp. 13 (Oct. 2016).

Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).

Boman, K., "DAS technology expands fiber optic applications for oil, gas industry," Rigzone, (May 4, 2015) issue: http://www.rigzone.com/news/oil_gas/a/138405/DAS_Technology_Expands_Fiber_Optic_Applications_for_Oil_Gasindustry, pp. 4.

European Search Report for European Application No. EP 17764137.0 dated Mar. 6, 2019.

European Search Report for European Application No. EP 17764143.8 dated Mar. 4, 2019.

(56) References Cited

OTHER PUBLICATIONS

European Search Report for European Application No. EP 17764150.3 dated Mar. 4, 2019.
European Search Report for European Application No. EP 17764151.1 dated Mar. 4, 2019.
European Search Report for European Application No. EP17764146.1 dated Mar. 14, 2019.
Grayson, S., et al., "Monitoring acid stimulation treatments in naturally fractured reservoirs with slickline distributed temperature sensing," Society of Petroleum Engineers, pp. 17, (Jan. 2015).
International Search Report with written opinion dated Jun. 1, 2017 for International Application No. PCT/US2017/021667, pp. 8.
International Search Report with Written Opinion for International Application No. PCT/US2017/021674 dated May 25, 2017, pp. 10.
International Search Report with Written Opinion for International Application No. PCT/US2017/021678 dated Jun. 1, 2017, pp. 7.
International Search Report with Written Opinion for International Application No. PCT/US2017/021679 dated May 25, 2017, pp. 7.
International Search Report with Written Opinion for International Application No. PCT/US2017/021681 dated May 22, 2017, pp. 10.
International Search Report with Written Opinion for International Application No. PCT/US2017/21670 dated May 25, 2017, pp. 6.
Jin, G., and Roy, B., "Hydraulic-fracture geometry characterization using low-frequency DAS signal," The Leading Edge, vol. 36, No. 12, pp. 962-1044 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, pp. 7 (Jan. 2007).
Lord, D.L., "Study of Performation Friction Pressure Employing a Loarge-Scale Fracturing Flow Simulator," SPE Annual technical Conference and Exhibition, pp. 10 (Sep. 25, 1994).
Molenaar, M., et al., "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
Ouyang, L-B., et al. "Flow profiling via distributed temperature sensor (DTS) system-expectation and reality," Society of Petroleum Engineers, pp. 14 (2004).
Portis, D. H., et al., "Searching for the optimal well spacing in the eagle ford shale: A practical tool-kit," Unconventional Resources Technology Conference, pp. 8 (Aug. 12-14, 2013).
Sellwood S.M., et al., "An in-well heat-tracer-test method for evaluating borehole flow conditions," Hydrogeology Journal, Springer, vol. 23, No. 8, pp. 1817-1830 (Aug. 29, 2015).
Webster, P., et al. "Micro-Seismic detection using distributed acoustic sensing," society of Exploration Geophysicists, pp. 5 (Aug. 19, 2013).
Wheaton, B., et al. "A case study of completion effectiveness in the eagle ford shale using DAS/DTS observations and hydraulic fracture modeling," Society of Petroleum Engineers, pp. 11 (2016).
Wu, K., et al. "Mechanism analysis of well interference in unconventional reservoirs: Insights from fracture-geometry simulation between two horizontal wells," Society of Petroleum Engineers, vol. 33, No. 1, pp. 9 (Feb. 2018).

* cited by examiner

DAS METHOD OF ESTIMATING FLUID DISTRIBUTION

PRIOR RELATED APPLICATIONS

This application is a non-provisional application which claims benefit under 35 USC § 119(e) to U.S. Provisional Application Ser. No. 62/305,758 filed Mar. 9, 2016, entitled "LOW FREQUENCY DISTRIBUTED ACOUSTIC SENSING," and Ser. No. 62/305,777 filed Mar. 9, 2016, entitled "PRODUCTION LOGS FROM DISTRIBUTED ACOUSTIC SENSORS," each of which is incorporated herein in its entirety.

FEDERALLY SPONSORED RESEARCH STATEMENT

Not applicable.

FIELD OF THE DISCLOSURE

The present invention relates generally to the use of distributed fiber optic sensing, including Distributed Acoustic Sensing (DAS), in subterranean wellbores for hydrocarbon production. In particular, this application is directed to estimating fluid distributions utilizing fiber optic signals, including DAS signals, by measuring fluid flow through an oil or gas well that has been equipped with one or more optical fibers.

BACKGROUND OF THE DISCLOSURE

Oil and gas wells are typically stimulated by introducing a mixture of fluid and proppant into the well in order to create and/or propagate fractures. One common method of hydraulic fracturing or "fracking" is the "plug-and-perf" method.

The plug-and-perf process consists of pumping a plug and perforating guns to a given depth. The plug is set, the zone perforated, and the perforating guns removed from the well. A ball is pumped downhole to isolate the zones below the plug, and the fracture stimulation treatment is then pumped in. The ball-activated plug diverts fracture fluids through the perforations into the formation. After the stage is completed, the next plug and set of perforations are initiated, and the process is repeated moving further up the well.

Plug-and-perf completions are extremely flexible multistage well completion techniques for cased hole wells. Each stage can be perforated and treated optimally because options remain open and variations can be exercised up to the moment the perforating gun is fired. The engineer can apply knowledge from each previous stage to optimize treatment of the current stage.

Each stimulation stage targets multiple sets of perforations, or called "perf clusters," in the well at one time. However, the distribution of the total flow into or out of each perf clusters is usually unknown, and that can lead to less efficient operation and increased cost.

Distributed Acoustic Sensing (DAS) is an acoustic detection technology that has recently been applied in production and geophysical settings. Downhole DAS is a fiber-optic distributed sensing technology that can provide key diagnostic insights during hydraulic fracturing operations.

In practice, fiber-optic cables can be installed in vertical and horizontal wells, which can be treatment wells, injector wells or observation wells. Within the cable, there are often both single mode fibers for DAS and multi-mode fibers for DTS. Multiple fibers within one cable can offer redundancy and the ability to interrogate with different instrumentation simultaneously.

DAS is the measure of Rayleigh scatter distributed along the fiber optic cable. A coherent laser pulse is sent along the optic fiber, and scattering sites within the fiber cause the fiber to act as a distributed interferometer with a gauge length approximately equal to the pulse length. The intensity of the reflected light is measured as a function of time after transmission of the laser pulse. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

Raw DAS data are usually in the form of optical phase, with a range from $-\pi$ to $+\pi$. The optical phase is defined by the interference pattern of the back-scattered laser energy at two locations separated by a certain length (gauge length) along the fiber. The phase varies linearly with a small length change between these two locations, which can be interpreted as axial strain change of the fiber in between. Depending on the vender, the measured optical phase is sometimes differentiated in time before it is stored. In this case, the DAS data can be considered as linear scaled fiber strain rates.

DAS has been used to monitor hydraulic fracturing operations. The applications include injection fluid allocation (e.g. Boone et al. 2015), hydraulic fracture detection (e.g. Webster et al. 2013), and production allocation (e.g. Paleja et al. 2015). DAS has been also used extensively to measure strain in hydrocarbon wells. Hill (U.S. Pat. No. 8,950,482) monitors hydraulic fracturing during oil/gas well formation. Tubel (US20060272809) controls production operations using fiber optic devices. Hartog (US20090114386) deploys an optical fiber as a distributed interferometer that may be used to monitor the conduit, wellbore or reservoir. Minchau (US20130298665) provides an in-situ permanent method for measuring formation strain in a volume around a treatment well. In McEwen-King (US20130233537), acoustic data from distributed acoustic sensing is processed together with flow properties data to provide an indication of at least one fracture characteristic. This is in no way an all-encompassing review of the technology. A recent review was published by Webster (2013) and the field has continued to advance rapidly.

Unfortunately, a common problem in optimizing the performance of horizontal wells stimulated via hydraulic fracturing is determining the relative amounts that each fracture stage is contributing to the total oil production. Without this information, it is difficult to assess the effectiveness of various well treatment strategies during completion, or after production has commenced.

It has been proposed to use non-intensity based methods of using DAS for fluid distribution, which calculate a fluid velocity by having the DAS track a moving harmonic or disturbance of flow across the injected section. Also, some of the concepts could apply to methods of using a noise logging tool instead of DAS data. Examples of this are shown in McKinley, et al. (1973) and McKinley & Bower (1979).

WO2016069322 describes a method of treatment design to determine if the perforations are sealed, where the flow rate is modeled by FPM (Fracture Plugging Model) based on the principle of mass conservation and momentum conservation. However, without closely monitoring each perforation cluster, the model can only determine the overall flow rate, and cannot predict fluid/proppant behavior at a specific perforation cluster.

U.S. Pat. No. 9,416,644 describes a method of characterizing a downhole hydraulic fracturing process, in which flow data acquired by a flow monitor is correlated with the acoustic data acquired from DAS to obtain characteristics of the fracturing process. The flow monitor itself is an additional cost and may not be suitable for all fracturing operations.

Therefore, there is a need for an efficient way of measuring DAS data and converting the DAS noise intensity to the flow rate for each perforation cluster so as to calculate the optimal completion design.

SUMMARY OF THE DISCLOSURE

The method described herein generally relates to the use of DAS to measure fluid distribution through each perforation cluster, and then use this information to optimize the frack plan, and ultimately, hydrocarbon production.

Completion costs, especially through hydraulic fracturing, vary but are always a significant expenditure in all unconventional resources plays. Measurement and analysis of fluid distribution would allow completion engineers to optimize the process. With continued analysis, the disclosed method can be used to impact decisions on perf design, cluster spacing, the number of clusters per stage, frack fluid design, proppant pumping schedules, pump rate, etc. All these parameters affect appraisal and development economics in each unconventional asset, and are directly related to the flow rates in question.

In order to achieve the calculation of volumetric flow rate for each perf cluster, the well undergoing fracturing operation is equipped with fiber optic cables for detecting and recording DAS intensity signals along the wellbore. The wellbore has perforations along its length, and the perforations are divided into a plurality of non-overlapping "perforation clusters," where each perforation cluster has one or more, usually a plurality, of (N) perforations. Each perforation (or "hole") has a diameter (H). Here it is provided that the pump-work (W) is directly proportional to the DAS signal intensity at a given cluster location. The pump-work (W) is thus used to correlate with the actual volumetric flow rate through a series of modeling equations. Volumetric flow rate can thereby be calculated for each separate perf cluster from the recorded DAS data, thus facilitating the optimization of completion design.

In more detail, the invention includes any one or more of the flowing embodiments in any combinations thereof:

A method of optimizing fracturing in a well, the method comprising:
  recording distributed acoustic sensing (DAS) noise intensity signals from a well during a fracturing operation;
  deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces on fiber depths;
  locating a baseline channel having no perforations at that fiber depth;
  calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at said perforation cluster minus the DAS intensity from said baseline channel, and $C_4$ is a constant; and
  using said Q for each said perforation cluster to optimize a fracture plan for subsequent fracture stages in said well and implementing said optimized fracture plan in said well.

A system for calculating volumetric flow rate in a perforation cluster inside a wellbore undergoing hydraulic fracturing process that injects hydraulic fluids into the wellbore, comprising:
  a distributed acoustic sensing (DAS) monitoring device including a optical fiber that runs along the length of the wellbore, wherein the DAS optical fiber is coupled to an interrogating unit for emitting interrogating signals, the DAS monitoring device detects DAS noise intensity signals when mechanical strain causes deformation to the optical fiber;
  a computer coupled to the DAS monitoring device for recording DAS noise intensity signals detected by the DAS monitoring device;
  wherein the computer performs the following steps to obtain volumetric flow rates of the hydraulic fluid through each said perforation cluster:
    deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces on fiber depths;
    locating the fiber depths of each said perforation cluster inside said well;
    locating a baseline channel having no perforation in that fiber depth for each said trace;
    calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at the perforation cluster minus the baseline DAS intensity from the same trace, and $C_4$ is a constant.

A method of plug and perf fracturing a well, the method comprising:
  recording distributed acoustic sensing (DAS) noise intensity signals from a well during a first stage of a plug and perf fracturing operation in said well;
  deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces on fiber depths;

identifying the fiber depths of each said perforation cluster inside said well;

locating a baseline channel having no perforations at that fiber depth;

calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at said perforation cluster minus the DAS intensity from said baseline channel, and $C_4$ is a constant; and optimizing a fracture plan for subsequent stages of said plug and perf fracturing operation and implementing said optimized fracturing plan in said well.

A system for calculating volumetric flow rate in a perforation cluster inside a wellbore undergoing hydraulic fracturing process that injects hydraulic fluids into the wellbore, comprising:

a distributed acoustic sensing (DAS) monitoring device including a optical fiber that runs along the length of the wellbore, wherein the DAS optical fiber is coupled to an interrogating unit for emitting interrogating signals, the DAS monitoring device detects DAS noise intensity signals when mechanical strain causes deformation to the optical fiber;

a computer coupled to the DAS monitoring device for recording DAS noise intensity signals detected by the DAS monitoring device;

wherein the computer performs the following steps to obtain volumetric flow rates of the hydraulic fluid through each said perforation cluster:

deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces on fiber depths;

locating the fiber depths of each said perforation cluster inside said well;

locating a baseline channel having no perforation in that fiber depth for each said trace;

calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at the perforation cluster minus the baseline DAS intensity from the same trace, and $C_4$ is a constant.

Any method as herein described, further comprising a step prior to the baseline channel locating step:

b-1) identifying cluster locations based on fiber depths of each said perforation cluster inside said well.

Any method as herein described, wherein the Intensity is directly proportional to a pump-work factor (W) represented by:

Intensity=$C_3 \cdot W$

Any method as herein described, wherein the pump-work factor W is calculated by the following equation:

$W = C_1 \cdot \Delta_P \cdot Q$ wherein $C_1$ is a constant, $\Delta_P$ is the pressure differential between both sides of the perforation.

Any method as herein described, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

Any method as herein described, wherein the Intensity is directly proportional to a pump-work factor (W) represented by:

Intensity=$C_3 \cdot W$

Any system as herein described, wherein the pump-work factor W is calculated by the following equation:

$W = C_1 \cdot \Delta_P \cdot Q$ wherein $C_1$ is a constant, $\Delta_P$ is the pressure differential between both sides of the perforation.

Any system as herein described, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

In more detail, the method processes recorded DAS data into different "traces" that cover a particular set of perf clusters on the well undergoing hydraulic fracturing operation, where a "trace" is a recording of DAS intensity at a span of different fiber depths or channels averaged over a portion of time.

As used herein, a "channel" or "control" refers to a length, which the DAS is capable of precisely measure and record. For interrogating signals in the 2 nanoseconds order of magnitude the channel is about 1 to 10 meters in length. The entire measuring length of the wellbore can therefore be divided into a number of consecutive channels to identify particular segments thereof. For example, for a channel of 10 meters in length, channel 100 can represent the segment of fiber optic cable that is 990 to 1000 meters from the wellpad.

As used herein, a "baseline" channel refers to a particular channel that is known to have no perforations, and therefore the measured DAS data represents the background or ambient noise to be subtracted from those obtained from perforated segments.

As used herein, a "perforation cluster" or "perf cluster" refers to a cluster of a predetermined number of perforations, typically along the wellbore spanning over a length, and three adjacent perforations may have equal or different distances between adjacent pairs.

The fiber optics used in this disclosure can be single-mode fiber optics or multi-mode fiber optic cable.

In fiber-optic communication, a single-mode optical fiber ("SMF") is an optical fiber designed to carry light only directly down the fiber—the transverse mode. Modes are the possible solutions of the Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers, where we can have waves with different frequencies, but of the same mode, which means that they are distributed in space in the same way, and that gives us a single ray of light. Although the ray travels parallel to the length of the fiber, it is often called transverse mode since its electromagnetic vibrations occur perpendicular (transverse) to the length of the fiber.

The main difference between "multi-mode" and single-mode optical fiber is that the former has much larger core diameter, typically 50-100 micrometers; much larger than the wavelength of the light carried in it. Because of the large core and also the possibility of large numerical aperture, multi-mode fiber has higher "light-gathering" capacity than single-mode fiber. However, compared to single-mode fibers, the multi-mode fiber bandwidth-distance product limit is lower. Because multi-mode fiber has a larger core-size than single-mode fiber, it supports more than one propagation mode; hence it is limited by modal dispersion, while single mode is not.

As used herein, reference to "depth" of a fiber optic cable refers to the length of the cable downhole, and does not imply that the entirety of the well is vertical, as many of these wells will have significant horizontal components.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| DAS | Distributed acoustic sensing |

DESCRIPTION OF EMBODIMENTS OF THE INVENTION

Turning now to the detailed description of one or more preferred arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 3A:
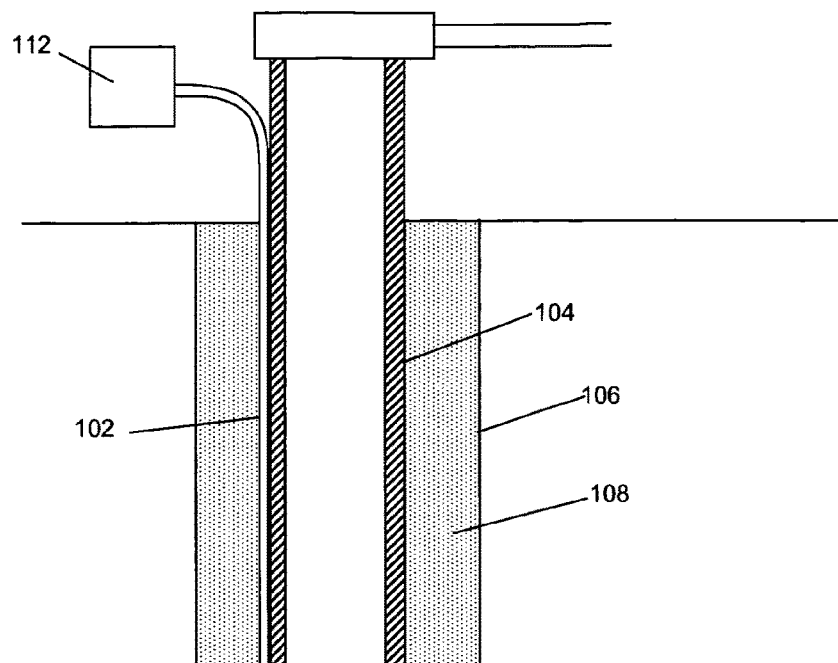
FIG. 3A shows an apparatus for monitoring a well using DAS.
Figure 3B:
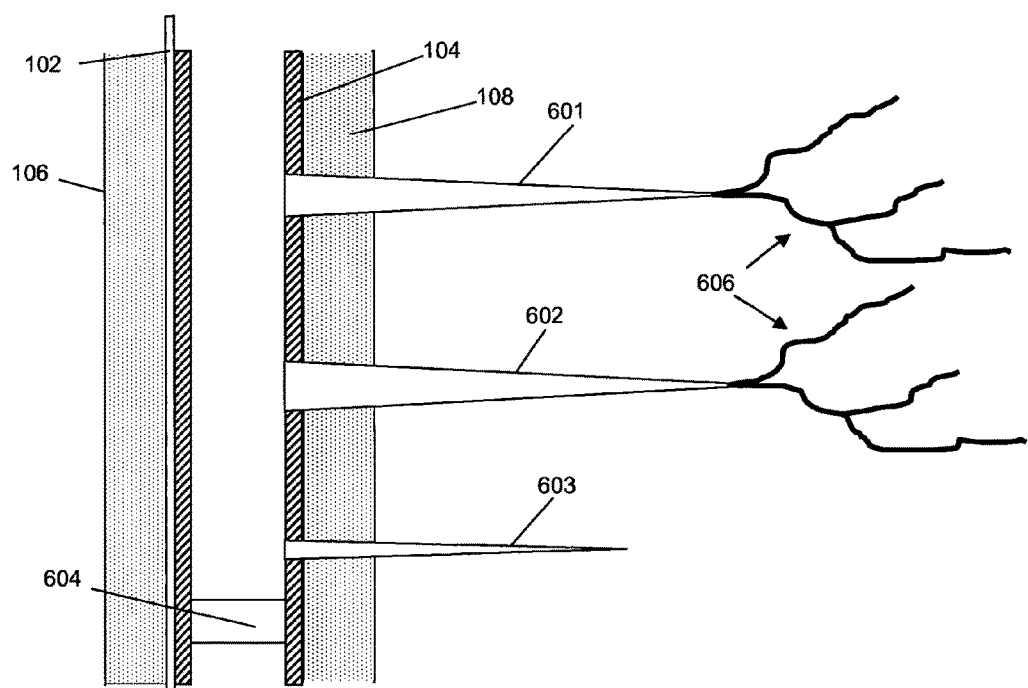
FIG. 3B illustrates a stage in a hydraulic fracturing process.

FIG. 3A shows a top portion of a well, and FIG. 3B shows a second portion deep inside the well. FIG. 3A shows a fiber optical cable 102 included along the path of the well. The well is formed at least in part by a metallic production casing 104 inserted into a bore hole 106, with the space between the outer wall of the casing 104 and the hole 106 being back filled with cement 108. The fiber 102 protrudes from the well head and is connected to interrogator/processor unit 112. FIG. 3B shows perforations 601, 602, 603 created through casing 104 and cement 108 into the surrounding rock formation by firing charges at different depths in the well. Blanking plug 604 isolates the deeper parts of the well which have been previously fractured. Once the perforations have been made the fluid and proppant are flowed into the well to cause fracturing 606.

The DAS technology is briefly explained herein. Through Rayleigh scattering, light transmitted down the cable will continuously backscatter light so that it can be sensed, preferably at the interrogating unit (IU). As light in an optical fiber travels at a speed of approximately 0.2 m/ns, a 10-ns pulse of light occupies about 2 m in the fiber as it propagates. In theory, each 10 nanoseconds of time in the optical echo response can be associated with reflections coming from a 1-m portion of the fiber (two-way time of 10 ns). By generating a repeated pulse every 100 μs and continuously processing the returned optical signal, it is possible to interrogate the entire length of up to 10 km of fiber at a 10-kHz sample rate.

Local changes in the optical signal, such as acoustic pressure or shear waves that impact the fiber to cause deformation, thus backscatter the interrogating light signal, making it possible to use the fiber as a continuous array of sensors with nearly continuous sampling in time and space.

While DAS has been used in seismic acquisition, no one has yet developed a method of converting DAS data into measuring volumetric flow rate of fracturing fluid into perforations of a treatment well. This disclosure describes a method of calculating or estimating volumetric flow rates of the fracturing fluids/proppant from DAS data that is readily obtained with existing fiber optics, without installation of additional sensors.

We propose that the DAS noise intensity is directly proportional to pump-work factor (W), which is defined in equation (1) below:

$$W = C_1 \cdot \Delta_P \cdot Q \quad (1)$$

where $C_1$ is a constant, $\Delta_P$ is the pressure differential between both sides of the perforation, and Q is the volumetric flow rate of the fluids.

The pressure differential $\Delta_P$ can be obtained by the following equation (2):

$$\Delta_P = C_2 \cdot Q^2 \cdot \frac{D}{N^2 \cdot H^4} \quad (2)$$

where $C_2$ is a constant, Q is the volumetric flow rate, D is the fluid density, N is the number of perforations, and H is the diameter of the perforations, assuming they are uniform. If not, N and H can be averaged for each relevant perforation cluster.

To solve the volumetric flow rate Q, we have proposed the proportional relationship between DAS noise intensity and pump-work W as in the following equation (3):

$$\text{Intensity} = C_3 \cdot W \quad (3)$$

where Intensity refers to the DAS noise intensity, i.e. the recorded DAS data for a specific channel minus the baseline noise for the same channel.

Therefore, the volumetric flow rate Q can be obtained by combining equations (1)-(3):

$$Q = C_4 \cdot \text{Intensity}^{\frac{1}{3}} \cdot N^{\frac{2}{3}} \cdot \frac{H^{\frac{4}{3}}}{D^{\frac{1}{3}}} \quad (4)$$

where $C_4 = \sqrt[3]{C_1 \cdot C_2 \cdot C_3}$

This data processing methodology can be further refined when seismic data obtained from off-set wells can be used to corroborate the DAS data and justify or calibrate the fluid propagation time, and the results can be used to calibrate fracture and reservoir stimulation model to facilitate optimization of completion and spacing. The results can also refine fracture geometry for new fracking configurations, which is beneficial for predicting well economy for future development.

We have acquired DAS data as described above from various wells that were undergoing hydraulic fracking, for example in unconventional filed, and exemplary data input is shown below in TABLE 1.

Scattered light pulses from nearby segments of the fiber are combined in an interferometer. The phase differences between the pulses is then a measure of their relative separations of their origins. A change in separation as small as one one-hundredth of a wavelength can easily and accurately be measured. This typically amounts to a $10^{-7}$ percentage change in fiber length (strain). Although DAS was originally designed to record fiber strains due to acoustic waves of frequencies up to 10 kHz, its response also extends to very low frequencies (<0.01 Hz). Preferably, this disclosure utilizes high frequency DAS (1-20 KHz, 5-15 KHz, 8-12 KHz, or about 10 KHz).

Data Acquisition

DAS signal is recorded in the stimulated well (in-well), and if necessary in the offset wells (cross-well) as well, during the completion and production stages. For example, the distribution delay between the treated wells and the offset wells may be further used to justify or correct the results obtained only from the treated well. However, for the simplicity of the mathematical model, only DAS signals recorded in the stimulated well were processed in this test.

The distances between the stimulated well and offset monitor wells range from 50 ft to 1200 ft. The fiber-optic cables are installed out of the casing and cemented in place to avoid unwanted DAS noise caused by fiber deformation during fluid injection. Numerous interrogators are available to record optical signals.

In one embodiment, Pinnacle Gen-1 and Phase-1 interrogators are used for the recording. The raw data are sampled at 10 kHz continuously at more than 6000 locations (referred as "channels" in this study) with 1 m spatial separation along the fiber. The gauge length is set to 5 m. When recording, the measured optical phase is differentiated in time, so the raw DAS data is linearly associated with strain rate along the fiber.

Data Processing

Figure 1:
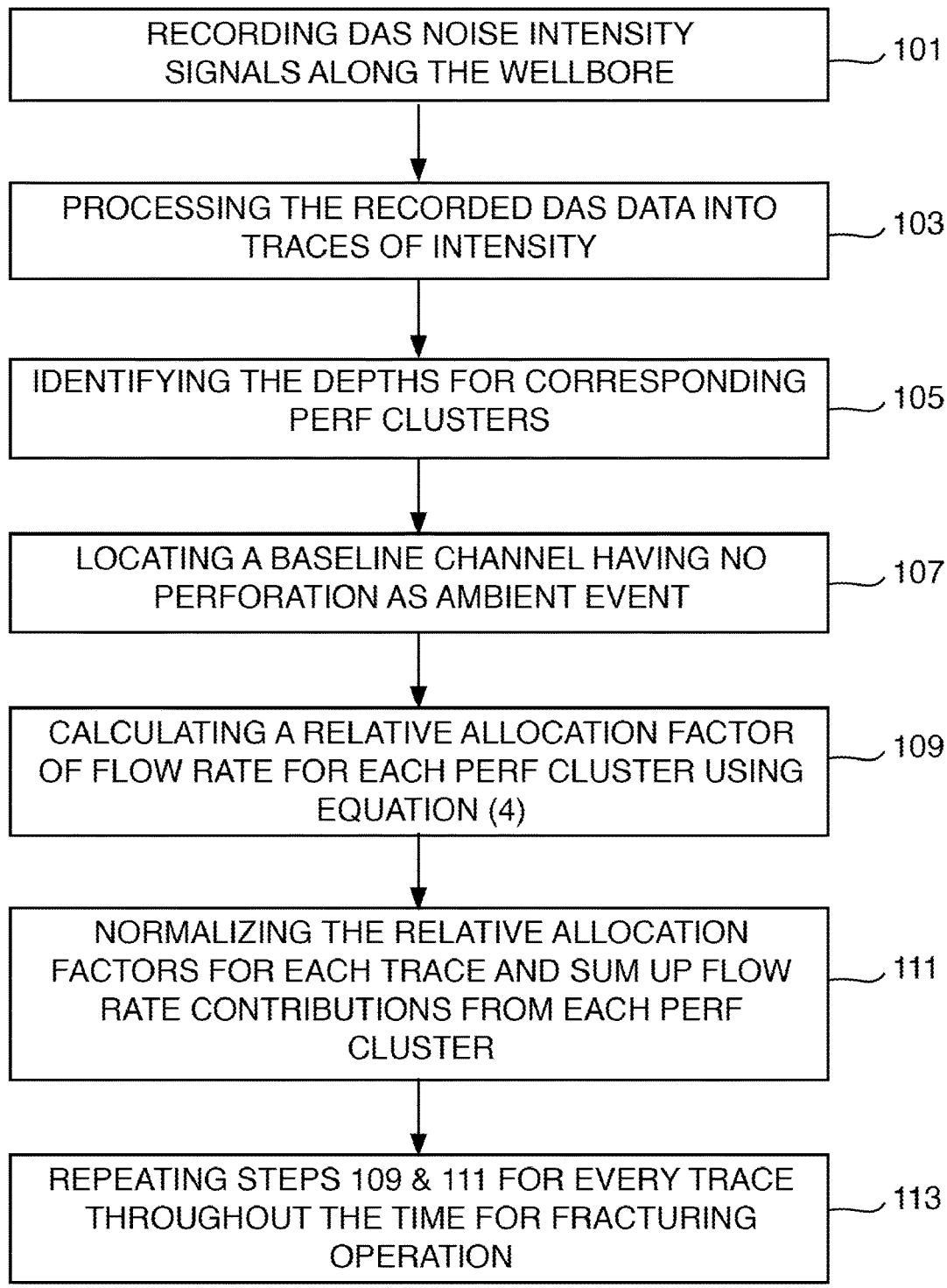
FIG. 1 is the flow diagram of the method of this disclosure.

FIG. 1 describes the data processing steps employed in our tests. In step 101, the DAS data is measured and recorded as described above. In the case where multi-mode fiber optic sensors are used, additional data collection can also be implemented to corroborate the DAS data.

In step 103, the recorded data is first divided into "traces" of DAS noise intensity, in other words the DAS data is first separated by the fiber depths and averaged over time, while the cumulative fiber depths must include all possible depths the fracturing fluids could flow out during the specified pumping period. Examples of processed data are shown below in TABLE 1.

TABLE 1

| EXEMPLARY DAS DATA | | | | | |
|---|---|---|---|---|---|
| Input: Intensity values for each cluster and floor | | | | | |
| Baseline | Cluster 5 | Cluster 4 | Cluster 3 | Cluster 2 | Cluster 1 |
| Depth (ft) | | | | | |
| 8236.882309 | 8259.90756 | 8296.090097 | 8332.272634 | 8371.744493 | 8404.637709 |
| Channel | | | | | |
| 2939 | 2946 | 2957 | 2968 | 2980 | 2990 |
| # Holes | | | | | |
| 0 | 4 | 4 | 6 | 6 | 8 |
| Jul. 6, 2014 8:41 | 7.428 | 10.585 | 5.156 | 9.168 | 7.924 | 10.041 |
| Jul. 6, 2014 8:41 | 7.396 | 10.572 | 5.152 | 9.184 | 8.043 | 10.042 |
| Jul. 6, 2014 8:41 | 7.489 | 10.424 | 4.997 | 9.405 | 7.99 | 10.233 |
| Jul. 6, 2014 8:41 | 7.368 | 10.417 | 4.952 | 9.382 | 7.742 | 10.241 |
| Jul. 6, 2014 8:41 | 7.602 | 10.357 | 4.926 | 9.476 | 7.816 | 10.252 |

TABLE 1-continued

EXEMPLARY DAS DATA

| Jul. 6, 2014 8:41 | 7.409 | 10.296 | 4.703 | 9.539 | 7.62 | 10.159 |
|---|---|---|---|---|---|---|
| Jul. 6, 2014 8:41 | 7.4 | 9.209 | 4.685 | 9.459 | 7.488 | 10.121 |
| Jul. 6, 2014 8:41 | 7.009 | 7.216 | 4.544 | 9.272 | 7.58 | 10.892 |
| Jul. 6, 2014 8:41 | 6.392 | 6.792 | 4.588 | 8.53 | 7.968 | 11.306 |
| Jul. 6, 2014 8:41 | 6.215 | 7.21 | 4.381 | 8.467 | 7.83 | 11.21 |

Adjusted Intensity values

| | CL 1 Intensity Over Floor | CL 2 Intensity Over Floor | CL 3 Intensity Over Floor | CL 4 Intensity Over Floor | CL 5 Intensity Over Floor |
|---|---|---|---|---|---|
| Jul. 6, 2014 8:41 | 2.613 | 0.496 | 1.74 | 0 | 3.157 |
| Jul. 6, 2014 8:41 | 2.646 | 0.647 | 1.788 | 0 | 3.176 |
| Jul. 6, 2014 8:41 | 2.744 | 0.501 | 1.916 | 0 | 2.935 |
| Jul. 6, 2014 8:41 | 2.873 | 0.374 | 2.014 | 0 | 3.049 |
| Jul. 6, 2014 8:41 | 2.65 | 0.214 | 1.874 | 0 | 2.755 |
| Jul. 6, 2014 8:41 | 2.75 | 0.211 | 2.13 | 0 | 2.887 |
| Jul. 6, 2014 8:41 | 2.721 | 0.088 | 2.059 | 0 | 1.809 |
| Jul. 6, 2014 8:41 | 3.883 | 0.571 | 2.263 | 0 | 0.207 |
| Jul. 6, 2014 8:41 | 4.914 | 1.576 | 2.138 | 0 | 0.4 |
| Jul. 6, 2014 8:41 | 4.995 | 1.615 | 2.252 | 0 | 0.995 |

In step 105, identify the fiber depth of the perforation clusters of interest and confirm with known depths of the perforation clusters in order to avoid any mismatching errors. This would be done by comparing the fiber depths with records of perforations created, or by performing a fluid test run while interrogating the fiber optics for a basic profile of the wellbore.

In step 107, a baseline channel within a particular trace is located, by selecting the channel where there are no known perforations. The DAS data obtained in this baseline channel will serve as a background noise signal to be subtracted from other DAS data obtained from channels having perforations. For example, in TABLE 2 above, the baseline channel is selected as channel 2939, and its DAS signal is subtracted from the DAS signals of clusters 1-5, as shown in the "CL# Intensity over floor" columns.

When the subtraction yields positive values, they are kept as is. When the subtraction yields negative values, the "CL# Intensity over floor" columns will have a "0" entry because the assumption is that the DAS intensity being directly proportional to the pump-work, which cannot be negative.

In step 109, the pump-work factor is calculated by applying the DAS intensity values to Equation (4) above. Examples of the resulting pump-work factor is shown in TABLE 2 below:

In step 111, once the pump-work factors for each perforation cluster are calculated, they are then normalized for each trace, and eventually the flow rate contribution from each of the perforation cluster is summed, as shown in TABLE 3 below. Here it is clearly seen that cluster 4 (so far) did not have any fluid flow detectable from DAS, thus did not contribute to the overall flow rate. However, as the fracturing liquid accumulates inside the wellbore, the flow pattern of each perforation cluster may change. In this case, the data indicates that cluster 4 was significantly involved in distributing fracturing fluids into the reservoir (data not shown).

In step 113, steps 109 and 111 are repeated for each and every trace throughout the stimulation operation, until all DAS traces are processed. The proppant flow rate is similarly calculated by using pump work factor W, but with the proppant concentration added as a weighting factor. However, because proppant was only injected once per stimulation (see TABLE 4), the values do not change over time.

Figure 2:
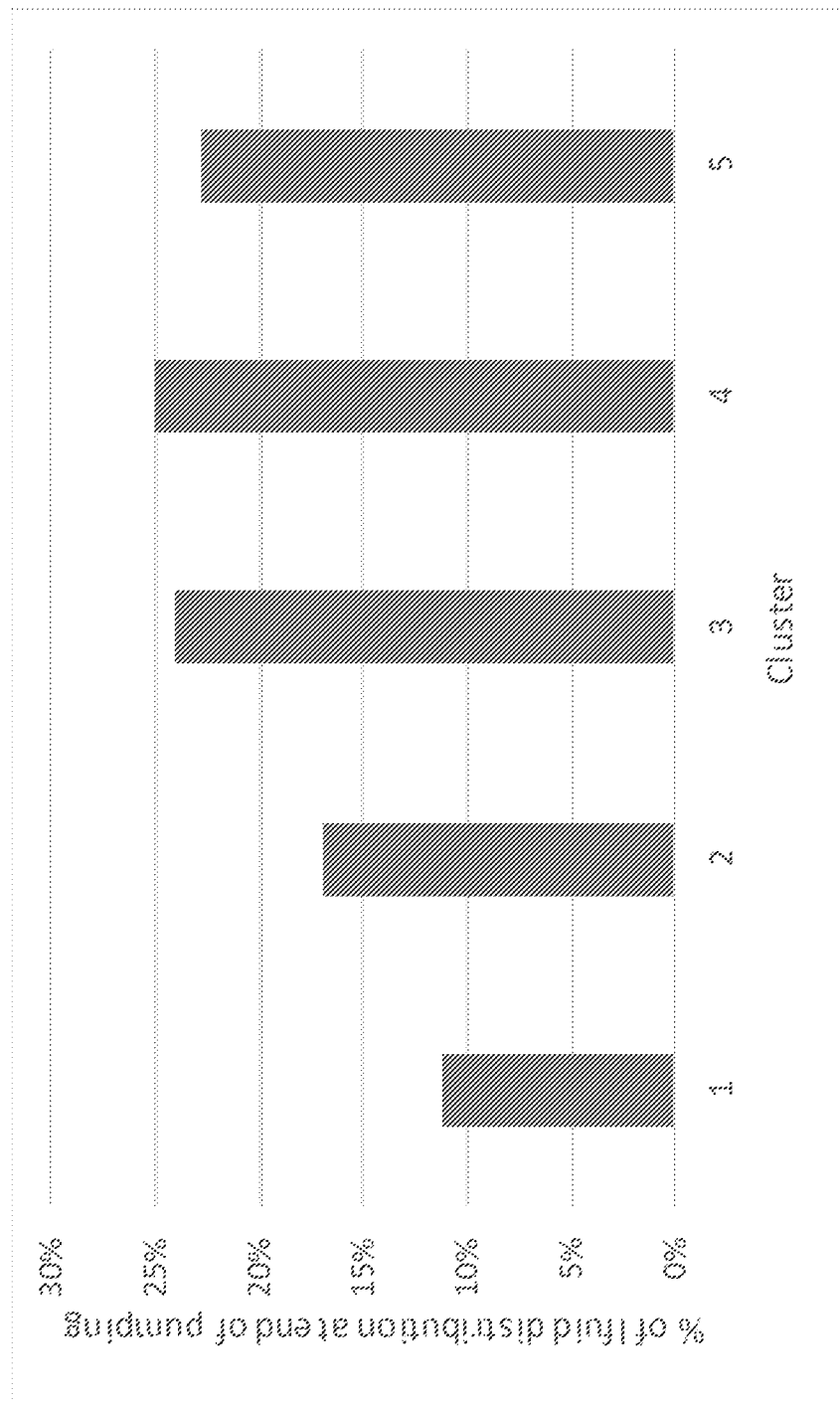
FIG. 2 is the fraction amount of volumetric flow rates of 5 perforation clusters in one example of this disclosure.

In this test, 5 perforation clusters are selected, and the exemplary resulting fractional amount of volumetric flow rate of all five clusters is shown in FIG. 2. As shown in FIG. 2, assuming the total volumetric flow rate is 1, the DAS intensity results can be converted to pump-work factor W, which then can be weighted to estimate the fluid distribution

TABLE 2

EXAMPLES OF OVERALL INJECTION RATE AND PUMP-WORK FACTOR W

| Slurry rate [bbl/min] | Bottom hole Proppant Concentration [lb/gal] | CL 1 Pump Work Factor | CL 2 Pump Work Factor | CL 3 Pump Work Factor | CL 4 Pump Work Factor | CL 5 Pump Work Factor | Pump Work Factor Sum |
|---|---|---|---|---|---|---|---|
| 1.52400 | 0.00100 | 5.509427358 | 2.613734031 | 3.971463569 | 0 | 3.696563647 | 15.7911886 |
| 1.53400 | 0.00000 | 5.53252355 | 2.855851321 | 4.007652019 | 0 | 3.703964584 | 16.09999147 |
| 1.58600 | 0.00000 | 5.6 | 2.622487392 | 4.101090331 | 0 | 3.607802009 | 15.93137973 |
| 1.58600 | 0.00000 | 5.686414759 | 2.378983159 | 4.169852142 | 0 | 3.653920851 | 15.88917091 |
| 1.58600 | 0.00000 | 5.535310015 | 1.975022699 | 4.070902451 | 0 | 3.532486645 | 15.11372181 |
| 1.73200 | 0.00000 | 5.604078661 | 1.965750155 | 4.248419251 | 0 | 3.588026061 | 15.40627413 |
| 2.99500 | 0.00000 | 5.584309822 | 1.468684092 | 4.200680162 | 0 | 3.070337968 | 14.32401204 |
| 2.99500 | 0.00000 | 6.287081953 | 2.739341664 | 4.335065711 | 0 | 1.490607983 | 14.85209731 |
| 3.20400 | 0.00000 | 6.80046133 | 3.842550389 | 4.25373144 | 0 | 1.856635533 | 16.75337869 |
| 3.31900 | 0.00000 | 6.837623058 | 3.873988637 | 4.328030331 | 0 | 2.515635344 | 17.55527737 | to each perforation cluster. As seen in FIG. 2, the fluid distribution of 5 perforation clusters add up to 1, in which cluster 1 has the lowest distribution, whereas cluster 4 has the highest, followed by cluster 3 and 5.

This information is particularly beneficial because now not only the fluid distribution can be estimated at relatively low cost, the fracking and completion design can also be adjusted accordingly. For example, more fluid may be diverted to cluster 1 for better production thereof, while directing fluid away from cluster 4 because excessive fracking fluid does not contribute to overall production.

The disclosed method therefore shows that the DAS data can be interpreted according to Equations (1)-(4) to obtain a directly proportional pump-work factor W, which is then used to calculate the volumetric flow rate of that particular perforation cluster. By summing up the flow rates of all clusters, the overall flow rate can be obtained.

The disclosed method can bring more subtle understanding about fluid/proppant distribution during a fracking operation. For example, if one perforation cluster receives much less fracturing fluids than others, it means the rocks around that depth are less fractured for production. The stimulation can then be optimized to direct more fluids to that cluster. Similarly, if one cluster is found to have excessive fluids/proppants, the resources are wasted and can be redirected to other part of the wellbore.

When the uneven fluid distribution is caused by fluid pumping mechanism, one can also revise the pumping method so that the fluids and proppants can be distributed more evenly.

The data processing method can also be used to monitor well performance over a long period of time, such that any significant change in production profile can be addressed with adjusted completion designs.

To further investigate the validity and applicability of the disclosed method, several corroborating experiments can be performed. For example, measuring and characterizing the DAS response to known variations in fluid flow parameters, such as flow rate, velocity, temperature, fluid phase, number of clusters, perforation diameter, and DAS delay coil length. Also, the fiber optics used in this disclosure are embedded in the external casing to avoid any undesirable deformation, but that would limit the applicability to wells already having fiber optics. We envision that with additional testing and calibration, the same methodology would be applicable to fiber optics deployed inside coiled tubing, thus broadening its use to non-fiber-equipped wells.

TABLE 3

FLOW RATE CONTRIBUTION PER CLUSTER

| CL 1% | CL 2% | CL 3% | CL 4% | CL 5% | CL 1 Instantaneous Rate | CL 2 Instantaneous Rate | CL 3 Instantaneous Rate | CL 4 Instantaneous Rate |
|---|---|---|---|---|---|---|---|---|
| 0.34889 | 0.16552 | 0.25150 | 0.00000 | 0.23409 | 0.53171 | 0.25225 | 0.38328 | 0.00000 |
| 0.34364 | 0.17738 | 0.24892 | 0.00000 | 0.23006 | 0.52714 | 0.27210 | 0.38185 | 0.00000 |
| 0.35151 | 0.16461 | 0.25742 | 0.00000 | 0.22646 | 0.55749 | 0.26107 | 0.40827 | 0.00000 |
| 0.35788 | 0.14972 | 0.26243 | 0.00000 | 0.22996 | 0.56760 | 0.23746 | 0.41622 | 0.00000 |
| 0.36624 | 0.13068 | 0.26935 | 0.00000 | 0.23373 | 0.58086 | 0.20725 | 0.42719 | 0.00000 |
| 0.36375 | 0.12759 | 0.27576 | 0.00000 | 0.23289 | 0.63002 | 0.22099 | 0.47761 | 0.00000 |
| 0.38986 | 0.10253 | 0.29326 | 0.00000 | 0.21435 | 1.16762 | 0.30709 | 0.87832 | 0.00000 |
| 0.42331 | 0.18444 | 0.29188 | 0.00000 | 0.10036 | 1.26782 | 0.55240 | 0.87419 | 0.00000 |
| 0.40592 | 0.22936 | 0.25390 | 0.00000 | 0.11082 | 1.30055 | 0.73487 | 0.81350 | 0.00000 |
| 0.38949 | 0.22067 | 0.24654 | 0.00000 | 0.14330 | 1.29272 | 0.73242 | 0.81826 | 0.00000 |

| CL 5 Instantaneous Rate | CL 1 Cumulative Fluid Distribution | CL 2 Cumulative Fluid Distribution | CL3 Cumulative Fluid Distribution | CL4 Cumulative Fluid Distribution | CL5 Cumulative Fluid Distribution | Cumulative Fluid Distribution Summation |
|---|---|---|---|---|---|---|
| 0.35675 | 0.53171 | 0.25225 | 0.38328 | 0.00000 | 0.35675 | 1.52400 |
| 0.35291 | 1.05885 | 0.52435 | 0.76513 | 0.00000 | 0.70967 | 3.05800 |
| 0.35916 | 1.61634 | 0.78543 | 1.17340 | 0.00000 | 1.06883 | 4.64400 |
| 0.36472 | 2.18394 | 1.02289 | 1.58962 | 0.00000 | 1.43355 | 6.23000 |
| 0.37069 | 2.76480 | 1.23014 | 2.01681 | 0.00000 | 1.80424 | 7.81600 |
| 0.40337 | 3.39482 | 1.45114 | 2.49443 | 0.00000 | 2.20761 | 9.54800 |
| 0.64198 | 4.56244 | 1.75822 | 3.37275 | 0.00000 | 2.84959 | 12.54300 |
| 0.30059 | 5.83026 | 2.31063 | 4.24693 | 0.00000 | 3.15018 | 15.53800 |
| 0.35507 | 7.13082 | 3.04549 | 5.06044 | 0.00000 | 3.50525 | 18.74200 |
| 0.47561 | 8.42354 | 3.77791 | 5.87870 | 0.00000 | 3.98086 | 22.06100 |

TABLE 4

PROPPANT DISTRIBUTION PER CLUSTER

| CL 1 Instantaneous Proppant Distribution | CL 2 Instantaneous Proppant Distribution | CL 3 Instantaneous Proppant Distribution | CL 4 Instantaneous Proppant Distribution | CL 5 Instantaneous Proppant Distribution | CL 1 Cumulative Proppant Distribution |
|---|---|---|---|---|---|
| 0.00053 | 0.00025 | 0.00038 | 0.00000 | 0.00036 | 0.00053 |
| 0.00000 | 0.00000 | 0.00000 | 0.00000 | 0.00000 | 0.00053 |

TABLE 4-continued

PROPPANT DISTRIBUTION PER CLUSTER

| | | | | | |
|---|---|---|---|---|---|
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |
| 0.00000 | 0.00000 | 0.00000 | 0.00000 | 0.00000 | 0.00053 |

| CL 2 Cumulative Proppant Distribution | CL 3 Cumulative Proppant Distribution | CL 4 Cumulative Proppant Distribution | CL 5 Cumulative Proppant Distribution | Cumulative Proppant Distribution Summation |
|---|---|---|---|---|
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |
| 0.00025 | 0.00038 | 0.00000 | 0.00036 | 0.00152 |

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The following references are incorporated by reference in their entirety for all purposes.

1. U.S. Ser. No. 62/305,777 "Production Logs from distributed acoustic sensors".
2. U.S. Ser. No. 62/305,758 Low-Frequency Analysis of DAS Signals
3. Co-pending application "Identifying Frac Spatial Density With Temperature," filed Mar. 8, 2017
4. Co-pending application "Hydraulic fracture monitoring by low-frequency DAS," filed Mar. 8, 2017
5. Co-pending application "Temperature measurement by combining DAS/DTS data," filed Mar. 8, 2017
6. U.S. Pat. No. 6,778,720, "Dual slope fiber optic array interrogator," (2004).
7. U.S. Pat. No. 8,950,482, "Fracture monitoring," (2009).
8. US20060272809, "Wellbores utilizing fiber optic-based sensors and operating devices," (2006).
9. US20090114386, "Systems and methods for distributed interferometric acoustic monitoring," (2009).
10. US20130298635, "Techniques for Distributed Acoustic Sensing," (2013).
11. US20130298665, "System and method for monitoring strain & pressure," (2013).
12. US20130233537, "Fracture Characterisation," (2013).
13. US20140202240, "Flow Velocity and Acoustic Velocity Measurement with Distributed Acoustic Sensing," (2014).
14. US20140216151, "Flow Monitoring," (2014).
15. US20140260588, "Flow Sensing Fiber Optic Cable and System," (2014).
16. US20140358444, "Method of Hydraulic Fracture Identification Using Temperature," (2014).
17. US20160003032, "Matrix Temperature Production Logging Tool," (2016).
18. WO2016069322, "Method of Treatment Design and Optimization of Sequenced Fracturing Technique," (2016).
19. U.S. Pat. No. 9,416,644, "Fracture Characterization," (2011).
20. Boone, K., (2015), DAS technology expands fiber optic applications for oil, gas industry: Rigzone, May 4 issue.
21. Webster, P., et al., "Developments in Diagnostic Tools for Hydraulic Fracture Geometry Analysis," Unconventional Resources Technology Conference (URTeC), Denver, Colo., 12-14 Aug. 2013.
22. Optasense, "Pipeline Integrity Management: Leak Detection," www.optasense.com (2013).

The invention claimed is:

1. A method of optimizing fracturing in a well, the method comprising:
 a) recording distributed acoustic sensing (DAS) noise intensity signals from a well during a fracturing operation;
 b) deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace does not overlap with other said traces;
 c) locating a baseline channel having no perforations;
 d) calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at said perforation cluster minus the DAS intensity from said baseline channel, and $C_4$ is a constant; and e) using said Q for each said perforation cluster to optimize a fracture plan for subsequent fracture stages in said well and implementing said optimized fracture plan in said well.

2. The method of claim 1, wherein the Intensity is directly proportional to a pump-work factor (W) represented by:

Intensity=$C_3 \cdot W$

3. The method of claim 2, wherein the pump-work factor W is calculated by the following equation:

$W = C_1 \cdot \Delta_P \cdot Q$ wherein $C_1$ is a constant, $\Delta_P$ is the pressure differential between both sides of the perforation.

4. The method of claim 3, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

5. The method of claim 1, further comprising step b-1) prior to step c):

b-1) identifying cluster locations based on fiber depths of each said perforation cluster inside said well.

6. A system for calculating volumetric flow rate through one or more perforation clusters inside a wellbore, comprising:

a) a distributed acoustic sensing (DAS) monitoring device including an optical fiber that runs along the length of the wellbore, wherein the DAS optical fiber is coupled to an interrogating unit for emitting interrogating signals, the DAS monitoring device detects DAS noise intensity signals when strain or temperature deforms the optical fiber;

b) a computer coupled to the DAS monitoring device for recording DAS noise intensity signals detected by the DAS monitoring device;

c) wherein the computer performs the following steps to obtain volumetric flow rates of the hydraulic fluid through each said perforation cluster:

i) deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces;

ii) locating the depths of each said perforation cluster inside said well;

iii) locating a baseline channel having no perforation for each said trace;

iv) calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at the perforation cluster minus the baseline DAS intensity from the same trace, and $C_4$ is a constant.

7. The system of claim 6, wherein the Intensity is directly proportional to a pump-work factor (W) represented by:

Intensity=$C_3 \cdot W$

8. The system of claim 7, wherein the pump-work factor W is calculated by the following equation:

$W = C_1 \cdot \Delta_P \cdot Q$ wherein $C_1$ is a constant, $\Delta_P$ is the pressure differential between both sides of the perforation.

9. The system of claim 8, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

10. A method of plug and perf fracturing a well, the method comprising:

a) recording distributed acoustic sensing (DAS) noise intensity signals from a well during a first stage of a plug and perf fracturing operation in said well;

b) deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces;

c) identifying the depths of each said perforation cluster inside said well;

d) locating a baseline channel having no perforations;

e) calculating a volumetric flow rate Q for each said perforation cluster using the following equation:

$$Q = C_4 \cdot Intensity^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at said perforation cluster minus the DAS intensity from said baseline channel, and $C_4$ is a constant; and f) optimizing a fracture plan for subsequent stages of said plug and perf fracturing operation and implementing said optimized fracturing plan in said well.

11. The method of claim 10, wherein the Intensity is directly proportional to a pump-work factor (W) represented by:

Intensity=$C_3 \cdot W$

12. The method of claim 10, wherein the pump-work factor W is calculated by the following equation:

$W = C_1 \cdot \Delta_P \cdot Q$ wherein $C_1$ is a constant, $\Delta_P$ is the pressure differential between both sides of the perforation.

13. The method of claim 11, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

14. A system for calculating volumetric flow rate in a perforation cluster inside a wellbore undergoing hydraulic fracturing process that injects hydraulic fluids into the wellbore, comprising:
   a) a distributed acoustic sensing (DAS) monitoring device including a optical fiber that runs along the length of the wellbore, wherein the DAS optical fiber is coupled to an interrogating unit for emitting interrogating signals, the DAS monitoring device detects DAS noise intensity signals when mechanical strain causes deformation to the optical fiber;
   b) a computer coupled to the DAS monitoring device for recording DAS noise intensity signals detected by the DAS monitoring device;
   c) wherein the computer performs the following steps to obtain volumetric flow rates of the hydraulic fluid through each said perforation cluster:
      i) deriving DAS intensity traces from the recorded DAS noise intensity signals, wherein each said DAS intensity trace is a recording of DAS noise intensity over a span of a pre-determined number of fiber depths averaged over a predetermined period of time, and wherein each said trace do not overlap with other said traces;
      ii) locating the depths of each said perforation cluster inside said well;
      iii) locating a baseline channel having no perforation for each said trace;
      iv) calculating a volumetric flow rate Q for each said perforation cluster using the following equation:

$$Q = C_4 \cdot \text{Intensity}^{\frac{1}{3}} \cdot N^{\frac{2}{3}} \cdot \frac{H^{\frac{4}{3}}}{D^{\frac{1}{3}}}$$

wherein D is fluid density, N is the number of perforations in said perforation cluster, H is the diameter of the perforations, Intensity is the DAS intensity from each trace at the perforation cluster minus the baseline DAS intensity from the same trace, and $C_4$ is a constant.

15. The system of claim 14, wherein the Intensity is directly proportional to a pump-work factor (W) represented by:

$$\text{Intensity} = C_3 \cdot W$$

16. The system of claim 15, wherein the pump-work factor W is calculated by the following equation:

$$W = C_1 \cdot \Delta_P \cdot Q$$

wherein $C_1$ is a constant, $\Delta_P$ is the pressure differential between both sides of the perforation.

17. The system of claim 16, wherein the pressure differential $\Delta_P$ is calculated by the following equation:

$$\Delta_P = C_2 \cdot Q^2 \cdot \frac{D}{N^2 \cdot H^4}$$

where $C_2$ is a constant, D is the fluid density, N is the number of perforations, and H is the diameter of the perforations.

* * * * *